United States Patent
Iotti

(10) Patent No.: US 11,987,953 B2
(45) Date of Patent: May 21, 2024

(54) ACCESS LADDER FOR A VEHICLE

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

(*) Notice: Subject to any disclaimer, the term of this patent is extended or adjusted under 35 U.S.C. 154(b) by 772 days.

(21) Appl. No.: 17/101,357

(22) Filed: Nov. 23, 2020

(65) Prior Publication Data

US 2021/0156113 A1 May 27, 2021

(30) Foreign Application Priority Data

Nov. 25, 2019 (IT) .................. 102019000022053

(51) Int. Cl.
*E02F 9/08* (2006.01)
*B60R 3/02* (2006.01)
*E06C 5/04* (2006.01)

(52) U.S. Cl.
CPC .............. *E02F 9/0833* (2013.01); *B60R 3/02* (2013.01); *E06C 5/04* (2013.01)

(58) Field of Classification Search
CPC ........ E02F 9/0833; E02F 9/0858; B60R 3/02; E06C 5/04
See application file for complete search history.

(56) References Cited

U.S. PATENT DOCUMENTS

| | | | | |
|---|---|---|---|---|
| 2,340,191 A * | 1/1944 | Kuhlke | .............. | B29D 30/0601 425/38 |
| 4,074,788 A * | 2/1978 | Joubert | .................. | B60J 5/0487 292/259 R |
| 4,199,040 A | 4/1980 | Lapeyre | | |
| 6,179,312 B1 * | 1/2001 | Paschke | .................... | B60R 3/02 182/127 |
| 6,340,191 B1 * | 1/2002 | Brady | ....................... | B60R 3/00 296/180.2 |
| 6,971,657 B2 * | 12/2005 | King | ........................ | B60R 3/00 182/127 |
| 8,919,474 B2 | 12/2014 | Masuda et al. | | |
| 9,169,619 B2 | 10/2015 | Aoyama | | |
| 2013/0014481 A1 | 1/2013 | Dow | | |

(Continued)

FOREIGN PATENT DOCUMENTS

| | | |
|---|---|---|
| CN | 204323200 U | 5/2015 |
| DE | 69814599 T2 | 11/2003 |

(Continued)

OTHER PUBLICATIONS

Office Action (Enquiry) dated Jun. 22, 2023 in Russian Patent Application No. 2020138486/11(071270) with English machine translation attached, 9 pages.

(Continued)

*Primary Examiner* — Syed O Hasan

(74) *Attorney, Agent, or Firm* — Pearne & Gordon LLP; J. Gregory Chrisman

(57) ABSTRACT

Described is an access ladder for a vehicle, comprising two or more steps (1, 2, 3, 4), vertically superposed on each other, each of which comprises a main surface (10, 20, 30, 40). The projection on a horizontal plane of the main surface of each step (1, 2, 3, 4) protrudes at least partly from the projection on a horizontal plane of the main surface of a step above.

7 Claims, 5 Drawing Sheets

(56) References Cited

U.S. PATENT DOCUMENTS

| | | |
|---|---|---|
| 2014/0175833 A1 | 6/2014 | Masuda |
| 2015/0216124 A1 | 8/2015 | Dow |
| 2016/0032562 A1 | 2/2016 | Aoyama |
| 2017/0258001 A1 | 9/2017 | Dow |
| 2018/0116099 A1 | 5/2018 | Dow et al. |

FOREIGN PATENT DOCUMENTS

| | | |
|---|---|---|
| DE | 69935311 T2 | 10/2007 |
| EP | 1046748 A1 | 10/2000 |
| EP | 0966367 B1 | 5/2003 |
| EP | 2824244 A1 | 1/2015 |
| EP | 2824244 B1 | 11/2015 |
| RU | 2494889 C2 | 10/2013 |
| SU | 806498 A1 | 2/1981 |
| WO | 0014336 A1 | 3/2000 |
| WO | 2009058334 A1 | 5/2009 |
| WO | 2013021699 | 2/2013 |
| WO | 2015147231 A1 | 10/2015 |
| WO | 2018051319 | 3/2018 |

OTHER PUBLICATIONS

Office Action with Examination Search Report from Canadian Patent Application No. 3,100,363, Dec. 20, 2023, 6 pages.

\* cited by examiner

ACCESS LADDER FOR A VEHICLE

This invention relates to an access ladder for a vehicle. In particular, the invention relates to an access ladder which can be associated with a vehicle equipped with a driving position raised above the ground, to facilitate the climbing up and down of the driver.

Many operator vehicles, for example earthmoving vehicles, vehicles equipped with lifting arms, vehicles equipped with a rotating tower and others, are equipped with a driving position located at a considerable height relative to the ground. Such vehicles are normally provided with access ladders, located near the driving position or in another part of the vehicle, to facilitate the climbing up and down of the driver.

Typically, the access ladders comprise a plurality of steps superposed on each other and separated by a predetermined distance. Each step comprises a substantially horizontal surface, which protrudes in a cantilever fashion on one side or the other of the vehicle, to favour the resting of a foot of the driver.

In order to limit the dimensions of the ladder, the steps are usually superposed on each other vertically, so that the upper step hides from view the lower steps. This shape of the current ladders places the driver in a situation of risk every time he/she has to climb down from the driving position, since, beyond the upper step, he/she does not see the steps below, and is therefore forced to try to find them with a foot. The risk of incorrectly positioning the foot and sliding is therefore always relatively high.

The aim of the invention is to provide an access ladder for a vehicle which allows the drawbacks of the access ladders currently available to be overcome.

An advantage of the access ladder according to the invention is that it allows a good visibility of all the steps below the upper step.

Another advantage of the ladder according to the invention is that its overall dimensions are substantially similar to the dimensions of the current access ladders.

Further features and advantages of the invention are more apparent from the detailed description which follows of an embodiment of the invention, illustrated by way of a non-limiting example in the accompanying drawings in which.

Figure 1:
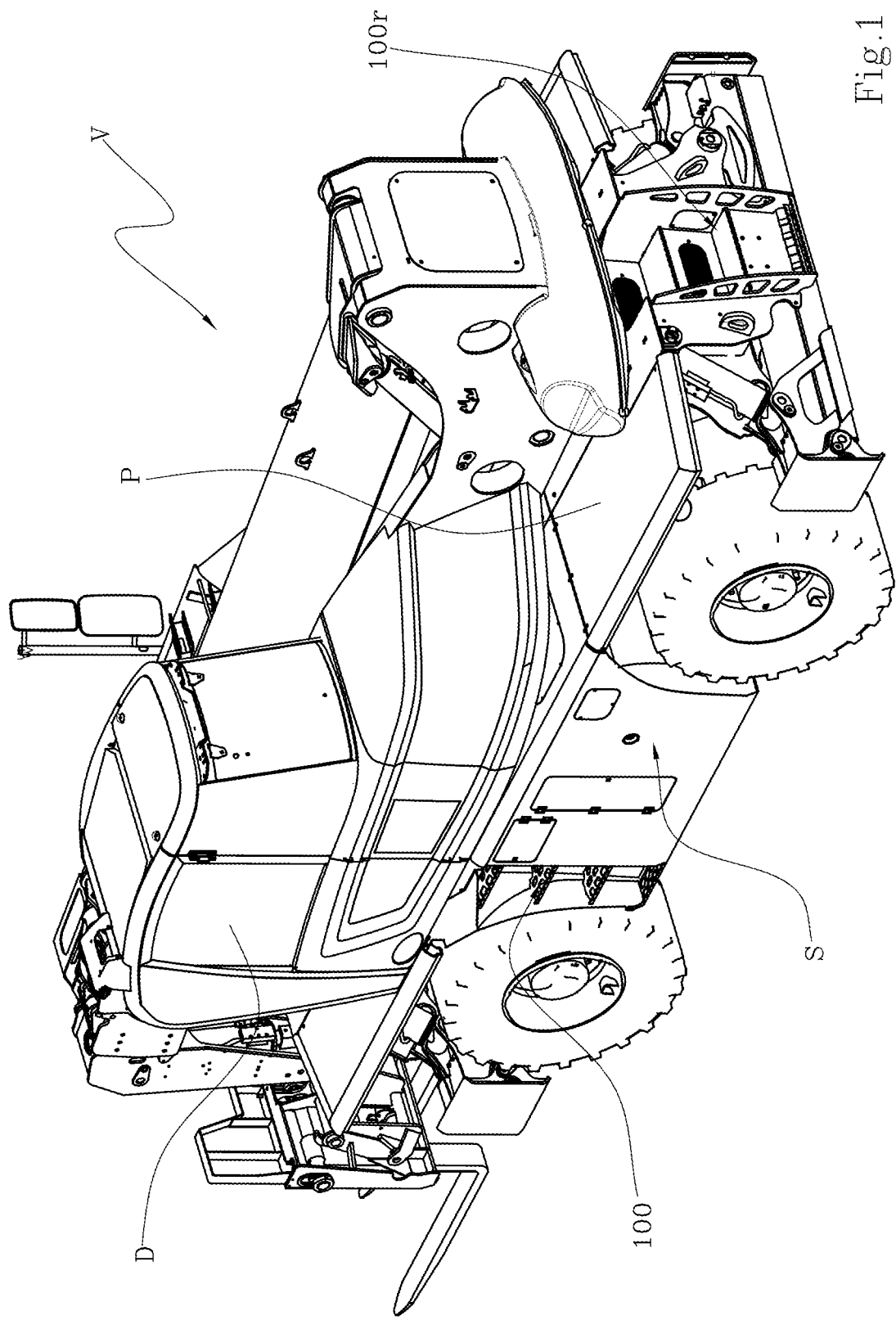
FIG. 1 is an isometric view of a vehicle equipped with at least one access ladder according to the invention.

The vehicle (V) illustrated by way of example in FIG. 1 is a vehicle designed for supporting and operating a lift arm, not illustrated. The vehicle (V) comprises a platform (P), designed to support the base of the lift arm, on which is positioned a driving position (D) at a predetermined height above the ground, represented in the form of a cab. The vehicle (V) has four sides (S). According to the embodiment illustrated, the sides (S) extend downwards from the platform (P) at a predetermined height above the ground.

The access ladder according to the invention comprising two or more steps (1, 2, 3, 4) superposed vertically. Each step comprises a main surface (10, 20, 30, 40), designed to support the driver's feet. Preferably, but not necessarily, the main surface (10, 20, 30, 40) is substantially horizontal and is associated in a cantilever fashion with the side (S) of the vehicle (V). According to other embodiments of the ladder, the main surface of a step could be associated with a crosspiece or pin, connected to the vehicle (V) at its relative ends.

According to the embodiments illustrated, the steps (1, 2, 3, 4) are positioned inside a recess made on the side (S) of the vehicle, and are accessible substantially only from a front side, that is, a free side facing towards the outside of the vehicle. According to other embodiments, the steps (1, 2, 3, 4) might be associated protruding from the side (S) of the vehicle.

Advantageously, the projection at right angles on a horizontal plane of the main surface of each step (1, 2, 3, 4) protrudes at least partly from the projection at right angles on a horizontal plane of the main surface of stepabove. In other words, the orthogonal projection of the main surface (1, 2, 3, 4) of each step on the main surface of an underlying step does not entirely cover the main surface of the step below, but leaves free at least one portion. For example, the border of the orthogonal projection on a horizontal plane of the main surface of each step is contained within the border of the orthogonal projection on the same horizontal plane of the step below.

Thanks to the above-mentioned arrangement, if seen from above, the steps are all visible at least for the portion which protrudes from the projection of the upper step. This means that the driver, protruding from the driving position and looking downwards, is able to see all the steps, and can therefore safely rest a foot on every step.

According to a possible embodiment of the ladder, illustrated in FIGS. 2 and 3, the main surface of each step (1, 2, 3) has a window (1a, 2a, 3a) the orthogonal projection of which on a horizontal plane overlaps the orthogonal projection on the same horizontal plane of a portion of the step below. The lower step (4) may be made without a window.

In other words, the orthogonal projection of the window (1a, 2a, 3a) on the main surface of the step below leaves free at least a portion of the main surface of the step below. In this way, the driver, looking at a window (1a, 2a, 3a) from above, sees through the window a portion of the main surface of the step below. In particular, each step (1,2,3) is visible from above through the window (1a,2a,3a) of the upper step, without necessity that the lower step projects outwardly from the orthogonal projection of the lower step. In other words, the orthogonal projections of the steps remain inside the orthogonal projection of the lowest step. It is thus not necessary that the steps project frontally from each other. According to the embodiment illustrated, viewed at right angles on a same horizontal plane, the windows (1a, 2a, 3a), have at least one edge offset or protruding inside the border of the window above. For example, as shown in FIG. 3, the windows (1a, 2a, 3a) are positioned at one end of the steps (1, 2, 3). A rear edge (2b, 3b) of a lower window is offset forwards relative to a rear edge of an upper window. In this way, as shown in FIG. 3, at least a portion of the main surface of each step is visible through the window of the upper step.

Figure 2:
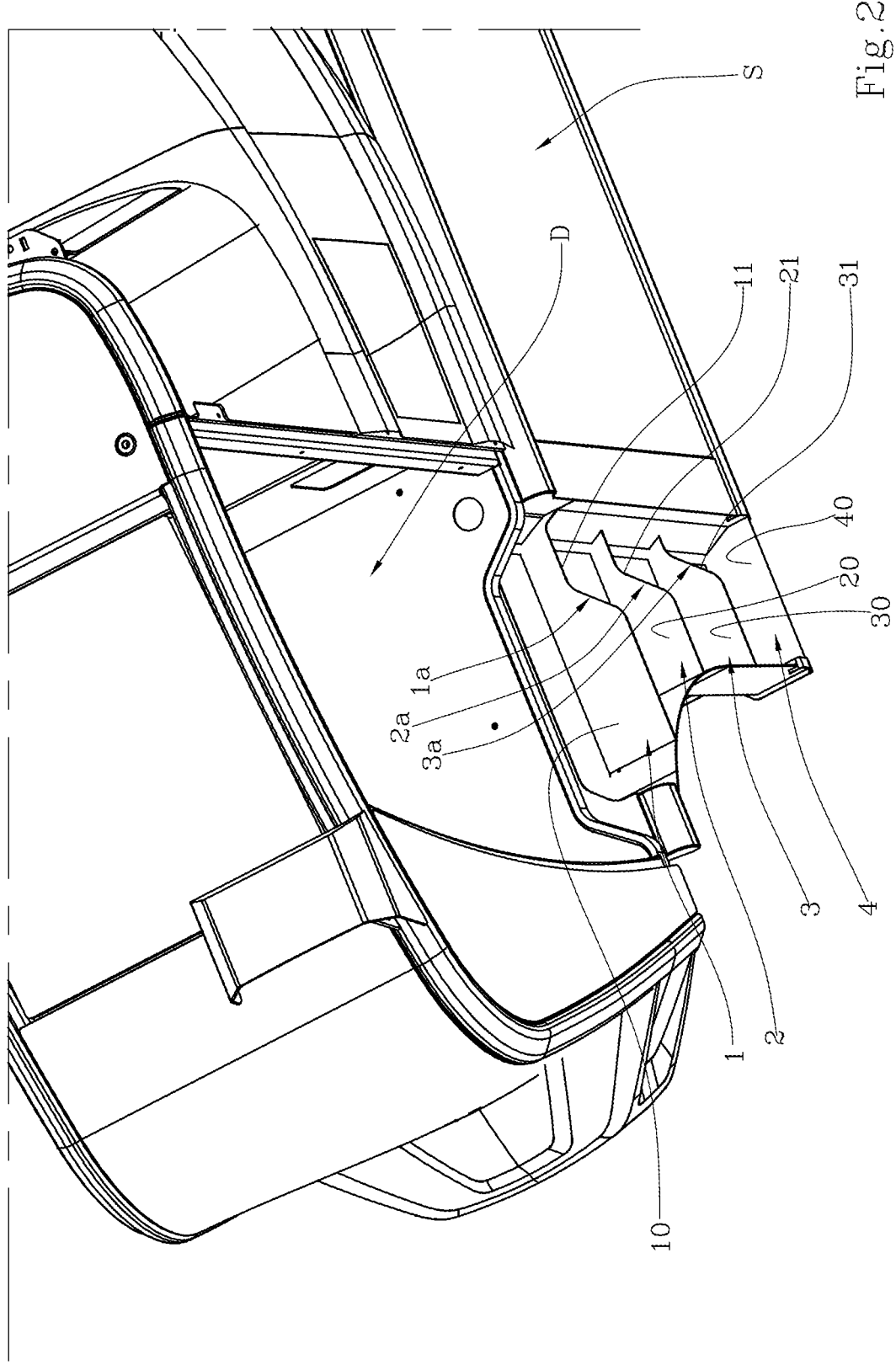
FIG. 2 shows a driving position of a vehicle and an access ladder according to the invention.
Figure 3:
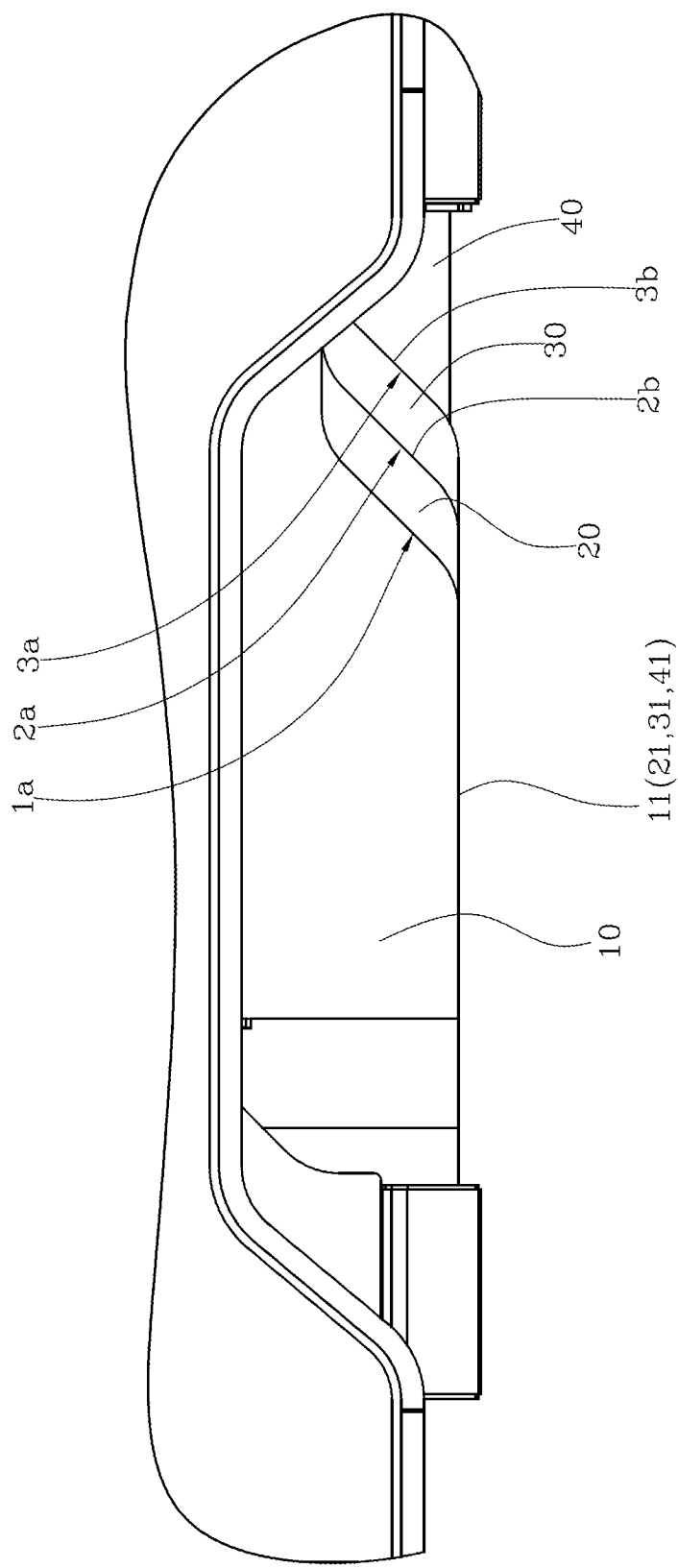
FIG. 3 is a plan view of the ladder of FIG. 2.

According to the embodiment shown in FIGS. 2 and 3, each window (1a, 2a, 3a) is made on a front edge (11,21, 31) of the respective step (1, 2, 3), that is, on a front edge (11, 21, 31) of the respective main surface (10, 20, 30). The front edge (11, 21, 31) is substantially a free and accessible edge of the main surface, that is to say, an edge from which the foot accesses the main surface.

Figure 4:
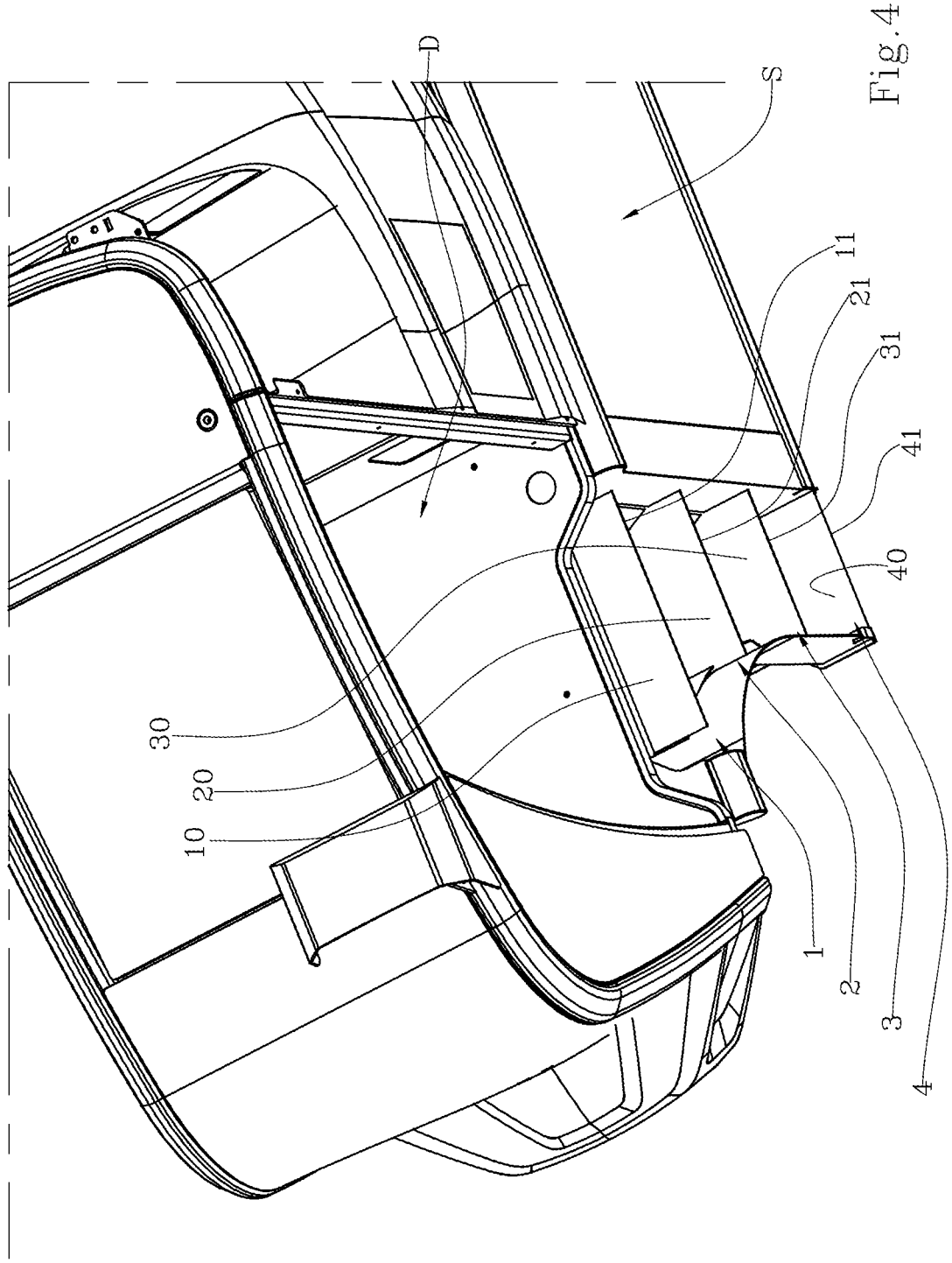
FIG. 4 shows a driving position of a vehicle and an access ladder according to the invention in an alternative embodiment.
Figure 5:
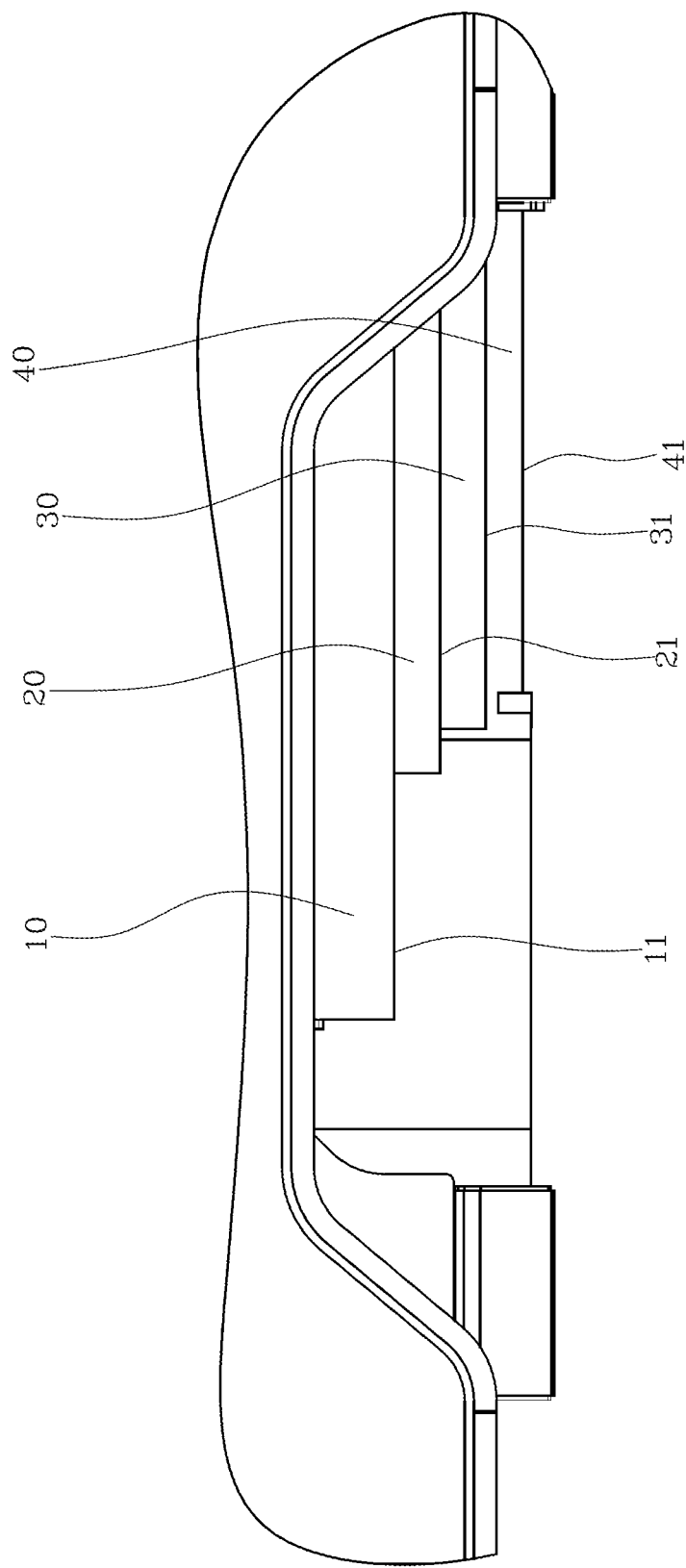
FIG. 5 is a plan view of the ladder of FIG. 4.

According to another possible embodiment, illustrated in FIGS. 4 and 5, the main surface (10, 20, 30, 40) of each step has a front edge (11, 21, 31, 41), that is, a free and accessible edge of the main surface from which access of the foot to the main surface is possible. In other words, the front edge (11, 21, 31, 41) is the outer edge of the main surface, that is to say, the free edge of the main surface.

Each front edge (11,21,31,41) protrudes from the orthogonal projection on a horizontal plane of the main surface of the step above. In other words, projecting at right angles the main surfaces of two consecutive steps on a same horizontal plane, the front edge (11, 21, 31, 41) of the lower step does not coincide with that of the upper step, but protrudes from the latter outwards, that is, outside the projection of the main surface of the step above.

According to the embodiment shown in FIGS. 4 and 5, if seen from above, the steps are all visible at least for the portion close to the front edge (11, 21, 31, 41) which protrudes from the projection of the main surface of the upper step. In this case, too, the driver, protruding from the driving position and looking downwards, is able to see all the steps, and can therefore safely rest a foot on every step.

As shown in FIG. 1, the access ladder (100) according to the invention can be positioned on a side (S) of the vehicle (V). For example, an access ladder (100) according to the invention is located close to and below the driving position (D). One or more further access ladders (100) according to the invention can be positioned in other zones of the vehicle, for example on a front and/or rear side of the vehicle, as shown in FIG. 1. Advantageously, the side access ladder (100), located below the driving position (D) is recessed in the overall dimensions of the vehicle chassis (or frame), which defines the platform (P), that is to say, it does not protrude relative to the overall dimensions of the vehicle chassis. In this way, the upper step of this ladder is inside the overall dimensions of the vehicle, so that the user is not forced to protrude from the vehicle to reach it. With regard to the front ladder (100f) and the rear ladder (100r), they are incorporated in the chassis delimited by the platform (P) and by the sides (S) and are preferably recessed in a respective recess made on the front and on the rear side of the vehicle, In practice, the steps of the front and rear ladders (100f, 100r) are shaped by the chassis itself and do not therefore consist of additional ladders, for example bolted to the chassis or attached as necessary.

In this way, the descent from the platform (P) of the chassis for the operator who leaves the cab (D), when the tower of the vehicle is rotated, is much safer than that allowed by the prior art.

It should be noted that the front and rear ladders (100f, 100r) are integral parts of the vehicle chassis.

The fact that the side ladder (100) located on the side (S) of the chassis is recessed relative to the outline of the chassis makes it possible to prevent it from striking objects or attaching to extraneous structure during manoeuvres. Moreover, as already mentioned, the user can access the ladder without the need to protrude from the vehicle, since the upper step is inside the overall dimensions of the chassis. In particular, the upper step is below the platform (P), and can be reached with a foot whilst the user is safely on the platform (P).

The use of further access ladders facilitates the climbing up and down of the driver to and from the vehicle even in the presence of obstacles which may obstruct access to a side of the vehicle.

The invention claimed is:

1. An access ladder for a vehicle, comprising two or more steps, vertically superposed on each other, each of which comprises a main surface wherein the projection on a horizontal plane of the main surface of each step protrudes at least partly from the projection on a horizontal plane of the main surface of a step above wherein, with the exception of a lower step, the main surface of each step has a window at one end of the step whose projection on a horizontal plane disposed in a front to rear direction of the vehicle overlaps a portion of a step below, wherein the orthogonal projections of the steps remain inside the orthogonal projection of the lowest step, and each window is made on a front edge of the respective step.

2. The ladder according to claim 1, wherein each front edge protrudes from the projection on a horizontal plane of the main surface of the step above.

3. A vehicle equipped with a driving position positioned at a predetermined height above the ground, characterised in that it comprises an access ladder according to claim 1, positioned on a side of the vehicle.

4. The vehicle according to claim 3, wherein the access ladder is located close to and below the driving position.

5. The vehicle according to claim 3, wherein the access ladder is located within the dimensions of a chassis or frame of the vehicle, that is, it is recessed in a recess made on a side of the vehicle.

6. The vehicle according to claim 3, provided with a chassis equipped with wheels which carries the driving position, defined at the top by a platform, accessible from one or more access ladders integrated in the chassis.

7. An access ladder for a vehicle, comprising two or more steps, vertically superposed on each other, each of which comprises a main surface wherein the projection on a horizontal plane, disposed in a front to rear direction of the vehicle, of the main surface of each step protrudes at least partly from the projection on a horizontal plane of the main surface of a step above wherein, with the exception of a lower step, the main surface of each step has a window having an angled edge offset at one end of the step that overlaps a portion of a step below, wherein the orthogonal projections of the steps remain inside the orthogonal projection of the lowest step.

* * * * *